United States Patent [19]
Moir

[11] 3,816,771

[45] June 11, 1974

[54] PLASMA ENERGY TO ELECTRICAL ENERGY CONVERTER

[75] Inventor: Ralph W. Moir, Livermore, Calif.

[73] Assignee: The United States of America as represented by the United States Atomic Energy Commission, Washington, D.C.

[22] Filed: Feb. 9, 1973

[21] Appl. No.: 331,153

[52] U.S. Cl............................. 310/5, 176/3, 310/10
[51] Int. Cl. ........................................... H02n 4/00
[58] Field of Search ............ 313/63; 60/202; 310/2, 310/4, 5, 6, 11, 10; 328/227, 228, 229; 176/3, 4, 5

[56] References Cited
UNITED STATES PATENTS

| | | | |
|---|---|---|---|
| 3,342,404 | 9/1967 | Howe et al........................ | 313/63 X |
| 3,582,694 | 6/1971 | Gourdine............................ | 310/10 |
| 3,663,360 | 5/1972 | Post ...................................... | 176/3 |
| 3,668,065 | 6/1972 | Moir ..................................... | 176/3 |
| 3,713,967 | 1/1973 | Hamilton et al.................. | 310/10 X |

*Primary Examiner*—D. F. Duggan
*Attorney, Agent, or Firm*—John A. Horan; F. A. Robertson; Clifton E. Clouse

[57] ABSTRACT

Plasma from a fusion reactor is directed along a straight-line path and then converted directly to electrical energy by means of a plurality of parallel arrays of "venetian blind" collector grids, the planes of the arrays being mutually parallel and transverse to the plasma path. A relatively low retarding potential is applied to the first collector grid array for collecting low-energy ions, while successively higher retarding potentials are applied to each succeeding grid array for collecting ions of corresponding higher energy. The angles of the "venetian blind" grid arrays are adjusted to make them highly transparent to oncoming particles and highly opaque to particles that pass through but have insufficient energy to reach the next grid array and so return to and are collected by the preceding grid array.

5 Claims, 2 Drawing Figures

PLASMA ENERGY TO ELECTRICAL ENERGY CONVERTER

BACKGROUND OF THE INVENTION

The present invention relates to direct conversion of plasma energy to electrical energy, and more particularly it relates to a converter that separates the charged particles of a plasma produced in a fusion reactor according to the kinetic energy of the particles.

One method of extracting power from a controlled thermonuclear fusion reactor is by the direct conversion of the energy carried by charged particles of the plasma produced in the reactor to an electrical current at high voltage. This has been suggested before as described in U.S. Pat. No. 3,663,360, issued May 16, 1972, to Richard F. Post, who shows apparatus in which a plasma of dissociated positive ions and negative electrons from a fusion reactor is guided through a magnetic expander or nozzle that simultaneously reduces the plasma density and forms the plasma into a beam. The electrons in the beam are then separated from the ions; and the ions remaining in the beam are directed through electric fields of successively higher potentials that are peripheral to the beam and which cause the ions to slow and separate into energy groups which are then deflected and collected on high-voltage electrodes for use as direct currents. Periodic electrostatic focussing is used to guide the ions as they slow down. However, in the Post apparatus, the ions are extracted from a high-density beam of relatively small cross section and the collection apparatus is situated only at the periphery of the beam. Such an arrangement results in a very large structure for high-power levels, generally makes inefficient use of space, and is severely current limited due to space charge effects.

SUMMARY OF THE INVENTION

The invention relates to a direct energy converter for converting the energy of a beam of ions directly to electrical energy. A converter constructed according to the invention comprises a plurality of mutually parallel ion collectors towards which the beam is directed at a slight angle to a perpendicular to the planes of the collectors. At least the first collector is virtually transparent to the beam and each collector is supplied with an electrostatic potential that is higher than the one applied to the preceding collector so that the ions are slowed and grouped according to their energy by the applied potentials and thereby collected on the collector to which a corresponding potential is applied. The first collector, and additional collectors as required, is a grid that is comprised of an array of spaced apart parallel ribbons. The ribbons of the first collector grid are oriented to be parallel and therefore transparent to the entering beam. The field between the first and second collectors causes ions that have insufficient energy to reach the second collector to be collected on the first, while ions of higher energy are only partially deflected from their original path. When additional collector grids are used, the ribbons of the second grid and each succeeding grid are oriented to be parallel to the majority of ions deflected by the preceding grid so as to make the grid maximally transparent to the ions traversing it in the forward direction. The angles of the ribbons of the collector grids also ensure that a large and virtually opaque collection area is presented to ions that are too slow to make it to the next grid and so return to the preceding grid for collection. Since the collector grids can be made to have very large cross sections in two dimensions, the ion beam may also be of very large cross section in two dimensions so that the beam does not need to be focussed. This also minimizes beam blowup because in a beam of large cross section, the space charge fields internal to the beam are equal in all transverse directions because of the long distances to the periphery of the beam. Beam blowup is further minimized since the space charge fields that are longitudinal, i.e., are in the direction of the beam, are in the same direction as the collector fields. The longitudinal space charge fields therefore can be made comparable in strength to the collector fields by choice of close or wide spacing of the collectors.

It is an object of the invention to collect ions from plasma beams of wide energy spread.

Another object is to provide a direct energy converter capable of handling large ion currents.

Another object is to provide a large collection area in a compact space in a direct energy converter.

Another object is to maximize the energy recovery efficiency of a direct energy converter.

Another object is to provide a direct energy converter having an energy recovery efficiency of greater than 60 percent.

Another object is to minimize space charge effects in a direct energy converter so that direct energy conversion of a plasma mean energy down to 10 Kev is possible.

Another object is to minimize the effects of beam blowup in a direct energy converter.

Other objects and advantageous features of the invention will be apparent in a description of a specific embodiment thereof, given by way of example only, to enable one skilled in the art to readily practice the invention, and described hereinafter with reference to the accompanying drawings.

DESCRIPTION OF AN EMBODIMENT

Figure 1:
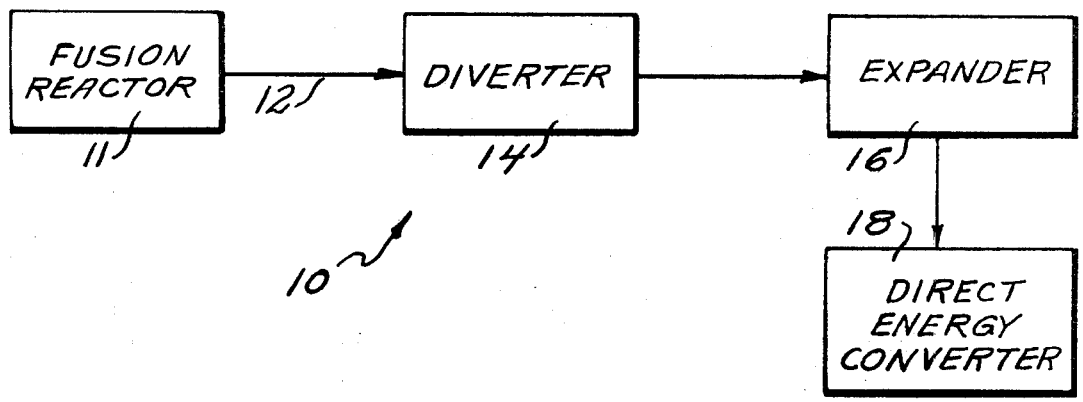
FIG. 1 is a block diagram of a system including a direct energy converter in which plasma energy is converted directly to electrical energy according to the invention.

Referring to the drawing there is shown in FIG. 1 a block diagram of a system 10 in which plasma energy is converted directly to electrical energy. The system includes a fusion reactor 11 for producing a plasma 12 of positive ions and negative electrons, a diverter 14 for removing the plasma from the reactor, an expander 16 that changes the rotational energy of the plasma to translational energy and spreads the plasma over a larger cross section, thereby reducing the energy density of the plasma, and a direct energy converter 18 for converting the charge of the ions of the plasma directly to electrical current. The expander preferably expands the plasma in two dimensions to conserve space, and the expander conveniently may be conically shaped.

Figure 2:
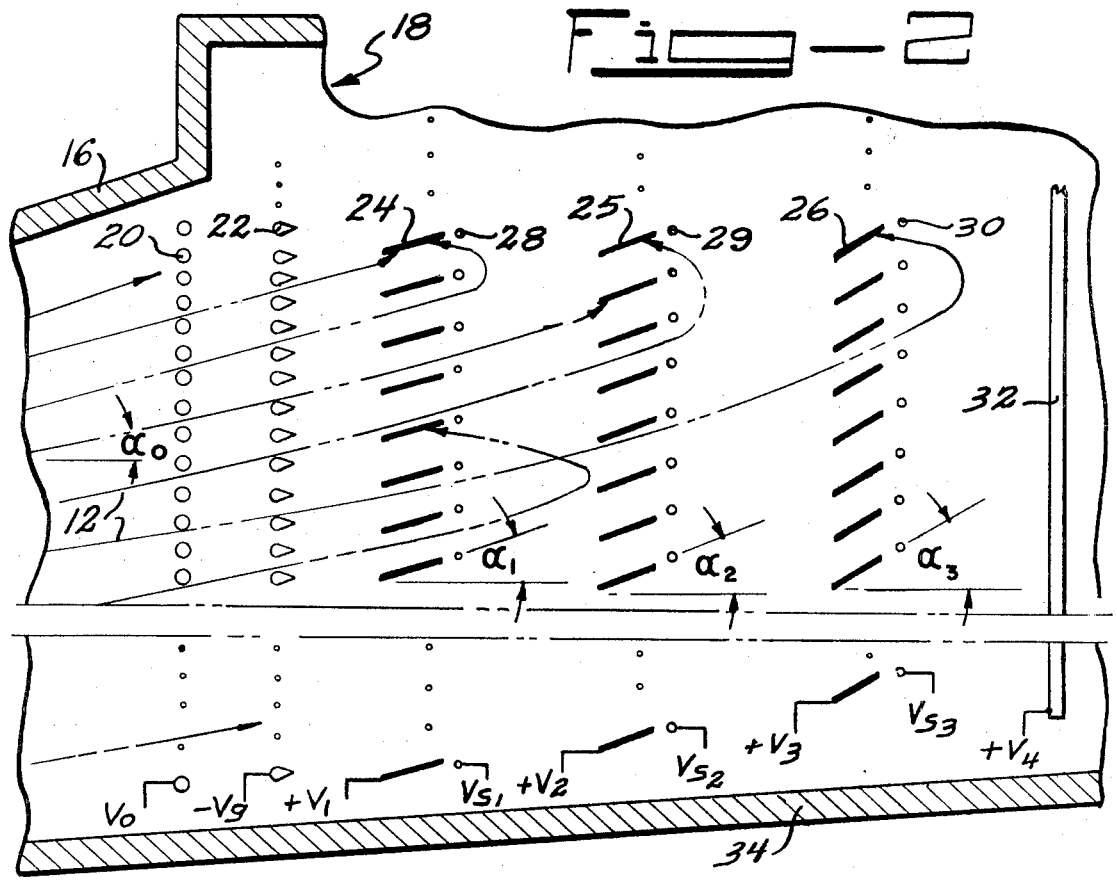
FIG. 2 is a diagram partially in cross section and with portions broken away of the direct energy converter of the system of FIG. 1.

Referring to FIG. 2, the converter 18 is shown diagrammatically, partially in cross section and with portions broken away. The converter includes a grounded reference grid 20, an electron reflector grid 22, first, second and third collector grids 24, 25 and 26 with respective secondary electron suppressor grids 28, 29 and 30, and a collection plate 32, all suitably mounted in a housing 34. The reference grid 20 is grounded at a reference potential $V_o$ to collect the electrons from the incoming plasma 12; the reflector grid 22 is held at a negative potential $-V_o$, which is less than the potential $V_o$, for reflecting to the reference grid 20 plasma electrons not collected by the grid 20 and secondary electrons which are developed by incidental inpingement of the plasma or grids 20 and 22; the collector grids 24, 25 and 26 and the plate 32 are held at successively higher positive potentials $V_1$, $V_2$, $V_3$ and $V_4$ for establishing retarding electric fields and for collecting positive ions having an energy corresponding to the applied potentials; and the suppressor grids 28, 29 and 30 are held at potentials $V_{s_1}$, $V_{s_2}$ and $V_{s_3}$, respectively, such that $V_o < V_{s_1} < V_1, V_1 < V_{s_2} < V_2$, and $V_2 < V_{s_3} \leq V_3$. However, the suppressor grid potentials are only sufficiently lower than the potentials applied to the associated collector grids to return secondary electrons produced when ions strike the collector grids, back to the associated collector grid. This ensures that only minimal field distortion is produced between collector grids. Each of the elements of the suppressor grids is an elongated wire that is mounted in-line with a ribbon of the associated collector grid so as to make the suppressor grids maximally transparent to the plasma ions.

In operation, the incoming plasma is directed at the converter 18 at a slight angle $\alpha_o$ with respect to a perpendicular to the planes of the grids 20, 22, 24, 25, 26, 28, 29 and 30, and plate 32, which are all positioned to be mutually parallel. Electrons are removed from the plasma by the grids 20 and 22, leaving the remaining positive ions to be directed at the grid 24. The angle of the ribbons of the grid 24 are parallel and are adjusted to an angle $\alpha_1$ to the perpendicular for highest efficiency of transmission and collection whereby the ribbons are parallel to the path of the oncoming ions. Low-energy ions are retarded by the field between the grids 22 and 24 and collected on the grid 24 without passing through the grid 24. Higher energy ions pass through the grid 24 and into the retarding field between the collector grids 24 and 25. Some of these ions have insufficient energy to overcome the retarding field and are redirected thereby towards the grid 24. The direction of turn of all of the ions between the grids 24 and 25 is the same since all the ions enter the field between the grids at an angle that enables the force of the field to increase the angle. This causes the ions returning to the grid 24 to land on the grid surfaces that are exposed to the field and results in the grid being opaque to the returning ions to thereby ensure good collection efficiency. The ions of sufficient energy to overcome the field between the grids 24 and 25 are bent to a lesser degree; some impinge directly on the grid 25, while others pass on through the grid into the field between the grids 25 and 26. The ribbons of the grid 25 are oriented to be mutually parallel and at an angle $\alpha_2$ to the perpendicular to the plane of the grid. The angle $\alpha_2$ is greater than $\alpha_1$ and also is adjusted for highest efficiency of transmission and collection whereby the ribbons of grid 25 are parallel to the path of the ions passing through the grid. Again, lower energy ions in the field between the grids 25 and 26 return to the grid 25, while higher energy ions pass through the grid 26 which has ribbons oriented at an angle $\alpha_3$ to the perpendicular to the plane of the grid. The angle $\alpha_3$ is greater than $\alpha_2$ so that ribbons of grid 26 are parallel to the oncoming stream of ions. The ions of an energy corresponding to the potential $V_3$ are collected on the grid 26, while those of higher energy are collected on the plate 32.

It will be understood that although the invention has been described in terms of a specific embodiment for converting the energy of positive ions, the invention is equally applicable for converting negative ions. For example, the dissociated negative electrons in the beam 12 may be diverted to a converter similar to converter 18 for converting the energy of the electrons to electrical energy.

For a theoretical and mathematical treatment of the invention, reference is made to United States Atomic Energy Commission technical report No. UCRL-73930, " 'Venetian Blind' Direct Energy Converter for Fusion Reactors," R. W. Main and W. L. Barr, Lawrence Livermore Laboratory, University of California, Livermore, California, May 23, 1972.

While an embodiment of the invention has been shown and described, further embodiments or combinations of those described herein will be apparent to those skilled in the art without departing from the spirit of the invention.

What I claim is:

1. A direct energy converter for converting the energy of a beam of ions following a translational path, including:

a first ion collector comprised of a plurality of spaced apart parallel electrically conductive ribbons having opposing elongated edges lying in parallel planes that are transverse to said beam path, said ribbons being oriented at a first angle with respect to a perpendicular to said planes, said ribbons being parallel to the beam for maximal transparency thereto;

a second ion collector spaced from and parallel to said first ion collector;

means for applying a first potential to said first collector;

means for applying a second potential to said second collector, said second potential being higher than said first potential to establish a first retarding field, ions having insufficient energy to overcome said field being collected on said first collector;

said second collector being comprised of a plurality of spaced apart parallel electrically conductive ribbons having opposing elongated edges lying in parallel planes that are transverse to said beam and are parallel to the planes of said first collector, said ribbons of said second collector being oriented at a second angle with respect to a perpendicular to said planes, the ions that overcome said first field being deflected by the field to follow a first altered path, said ribbons of said second collector being parallel to said altered path;

a third ion collector comprised of a plurality of spaced apart parallel electrically conductive ribbons having opposing elongated edges lying in parallel planes that are transverse to the beam and are parallel to said planes of said first collector, said ribbons of said third collector being oriented at a third angle with respect to a perpendicular to said planes; and means for applying a third potential to said third collector, said third potential being higher than said said second potential to establish a second retarding field for the ions that pass into the space between said second and third collectors so that ions having insufficient energy to overcome said second field are collected on said second collector, the ions that overcome said second field being deflected thereby to follow a second altered path, said ribbons of said third collector being parallel to said second altered path for maximal transparency to the ions following said second altered path.

2. The converter of claim 1, further including:

a reference grid in the path of the beam before said first collector;

means for applying a reference potential to said grid to collect the electrons from the plasma;

an electron reflector grid in the path of the beam between said reference grid and said first collector; and means for applying a potential to said reflector grid that is less than said reference potential to reflect electrons that pass through said reference grid and to reflect secondary electrons which develop as a result of incidental impingement of the plasma on said reference grid and said reflector grid.

3. The converter of claim 1, further including:

a suppressor grid comprised of a plurality of elongated wires between said first and second collectors, each of said ribbons being associated with one of said wires, each of said wires being in-line with its associated ribbon; and means for providing a potential to said grid for suppressing secondary electrons emanating from said ribbons and to return the secondary electrons to said first collector in which they are developed when ions strike the ribbons.

4. The converter of claim 1, wherein said plasma is generated in a fusion reactor, further including:

a diverter for diverting plasma from the reactor;

an expander for reducing the energy density in two dimensions of the diverted plasma and for changing rotational plasma energy to translational energy along a straight-line path towards said first ion collector.

5. The converter of claim 4, wherein said expander is conically shaped.

* * * * *